United States Patent [19]
Cuerrier

[11] Patent Number: 6,038,804
[45] Date of Patent: Mar. 21, 2000

[54] SCENT DISPENSER

[76] Inventor: Gilles Cuerrier, 49 Main St., Chute-À-Blondeau, Ontario, Canada, K0B 1B0

[21] Appl. No.: 09/076,479

[22] Filed: May 12, 1998

[51] Int. Cl.[7] .................................................. A01M 31/06
[52] U.S. Cl. ...................................................................... 43/1
[58] Field of Search ...................... 43/1; 36/136; 239/36, 239/47; 222/175; D22/125; D23/366; 392/395; 401/198

[56] References Cited

U.S. PATENT DOCUMENTS

| | | | |
|---|---|---|---|
| D. 386,256 | 11/1997 | Turpin | D22/125 |
| 1,422,683 | 7/1922 | Eltgroth | 36/136 |
| 4,186,502 | 2/1980 | Foster | 43/1 |
| 4,682,715 | 7/1987 | Reeves . | |
| 4,722,477 | 2/1988 | Floyd . | |
| 4,735,010 | 4/1988 | Grinarml . | |
| 5,024,008 | 6/1991 | Maples . | |
| 5,074,439 | 12/1991 | Wilcox | 43/1 |
| 5,148,949 | 9/1992 | Luca | 43/1 |
| 5,327,667 | 7/1994 | Fore | 43/1 |
| 5,461,814 | 10/1995 | Reid et al. . | |

*Primary Examiner*—Kurt Rowan

[57] ABSTRACT

A scent dispenser for use when hunting comprising a member shaped to fit under the sole of a hunter's boot. The member has a reservoir for carrying liquid scent and an inlet opening for filling the reservoir. Closure means close the inlet opening. Attaching means on the member are used in attaching the member to a hunter's boot. There is an outlet opening from the reservoir in the bottom of the member. Distributing means lead from the opening downwardly and rearwardly for distributing the liquid coming out of the reservoir, through the opening, onto the ground when the member is in use worn on a boot. The member has ground contacting means on its bottom for protecting the distributing means. The ground contacting means preferably imitate a deer's hoof.

11 Claims, 2 Drawing Sheets

SCENT DISPENSER

BACKGROUND OF THE INVENTION

1. Field of the Invention

This invention is directed toward a hunting aid.

The invention is more particularly directed toward a scent dispenser to be used by a hunter to attract deer.

2. Description of the Related Art Including Information Disclosed Under CFR §§ 1.97–1.99

Scent dispensers are well known. The dispensers usually take the form of a container that is attached to the footwear of the hunter and that have a small opening for dispensing a liquid scent, such as deer urine, that is used to attract deer. The hunter walks for some distance, dispensing the liquid scent as he walks, and then waits for a deer to follow the scent so that he can shoot it.

The known dispensers have trouble in dispensing the liquid scent. Either they dispense too much through the dispensing hole in the dispenser and have to be constantly refilled making them both expensive and difficult to use, or they dispense too little making them relatively ineffective.

SUMMARY OF THE INVENTION

It is the purpose of the present invention to provide a scent dispenser that effectively dispenses the proper amount of liquid scent. It is another purpose of the present invention to provide a scent dispenser that leaves both a scent, and a track, that is more likely to attract a deer than known dispensers. It is another purpose of the present invention to provide a scent dispenser that is more likely to be bought by deer hunters.

In accordance with the present invention there is provided a scent dispenser that comprises a molded member having a reservoir for the liquid scent. The member is sized and shaped to fit under a hunter's boot, usually adjacent the heel of the boot. An outlet opening for the liquid is provided on the bottom of the member. In accordance with the present invention a liquid distributor, in the form of a few strands of material, are mounted in the bottom of the member in the opening and extend rearwardly from the opening to contact the ground. The strands dispense the liquid from the reservoir out of the opening in the member. The liquid runs down the strands to be evenly distributed on the ground as the hunter walks wearing the dispenser.

Ground contacting means project downwardly from the boot to protect the liquid distributor. The ground contacting means can comprise two pads defining a narrow groove between them. The liquid distributor is located in the groove between the pads. Preferably, the ground contacting means is in the shape of a deer's hoof with the groove formed by the space between the two main toes in the hoof. The liquid distributor is protected from damage being mounted between the toes of the hoof. The deer's hoof on the dispenser will help to sell the dispenser to hunter's. It may even be an aid in attracting deer, along with the scent, in leaving a deer track as the scent is dispensed.

The invention is particularly directed toward a scent dispenser for use when hunting comprising a member shaped to fit under the sole of a hunter's boot, the member having a reservoir for carrying liquid scent. An inlet opening is provided in the member for filling the reservoir and closure means normally close the inlet opening. Attaching means on the member are used to attach the member to a hunter's boot. There is an outlet opening from the reservoir in the bottom of the member. Distributing means lead from the opening downwardly and rearwardly for distributing the liquid coming out of the reservoir through the opening onto the ground when the member is in use worn on a boot.

DESCRIPTION OF THE PREFERRED EMBODIMENTS

Figure 1:
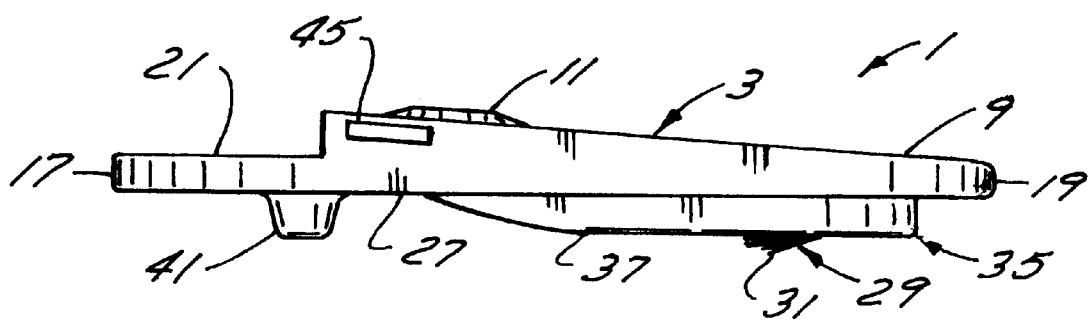
FIG. 1 is side view of the dispenser.
Figure 2:
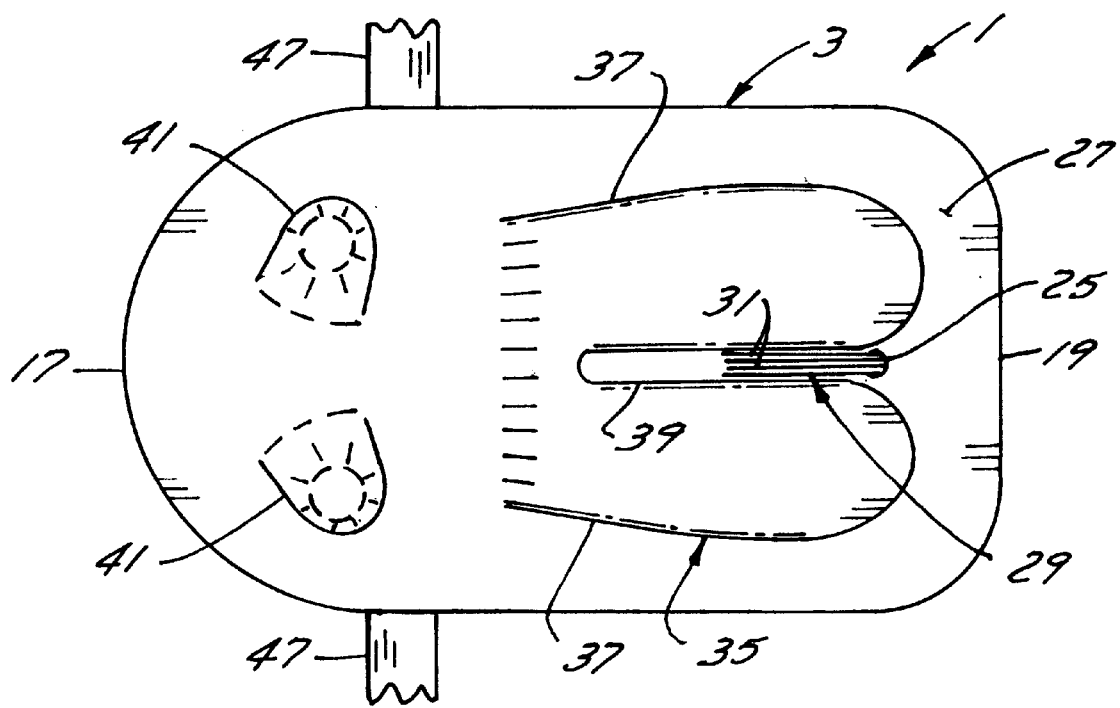
FIG. 2 is a bottom view of the dispenser.
Figure 3:
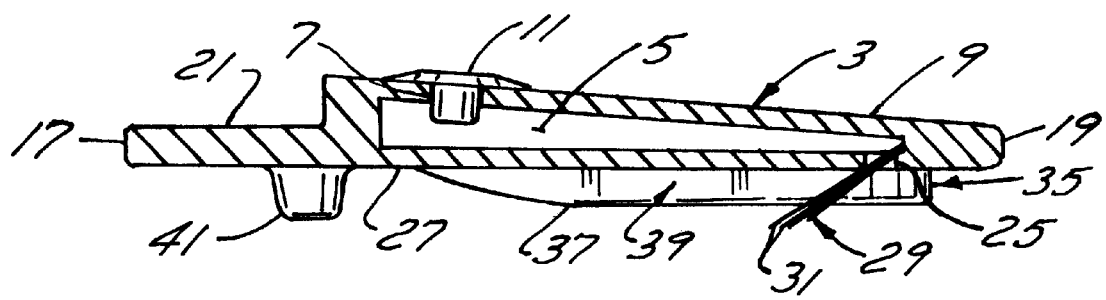
FIG. 3 is a longitudinal, cross-section view of the dispenser.

The dispenser 1, shown in FIGS. 1 to 3, comprises a relatively thin, molded member 3 which is hollow to form a reservoir 5 for holding liquid deer attractant or scent. The member 3 is preferably molded from suitable plastic material. The liquid deer scent is preferably deer urine which is readily purchased in hunting stores. An opening 7 in the top surface 9 of the member 3 allows the reservoir 5 to be filled. A plug 11 normally closes the opening 7. The plug 11 can be lifted up using the blade of a knife when the reservoir must be filled.

The top surface 9 of the member 3 tapers slightly from the back end 17 to the front end 19 and can be roughened to minimize slippage when mounted in place as will be described. The member 3 has a heel-receiving cutout or notch 21 in its top surface 9 extending forwardly a short distance from the back end 17 of the member.

The member 3 has a small outlet opening 25 in its bottom surface 27 near its front end 19. The opening 25 dispenses liquid from the reservoir 5. In accordance with the present invention, a liquid distributor 29 is provided on the member 3 for distributing the liquid from the opening 25 onto the ground when the dispenser 1 is used. The distributor 29 is in the form of a small number of strands 31 of material that are embedded or otherwise attached to the member 3 and extend downwardly and rearwardly through and from the opening 25 to contact the ground. The liquid in the reservoir 5 flows down the strands 31 through the opening 25. The strands allow a steady, controlled flow of the liquid, less than if the liquid was dispensed in drop form directly from the opening 25. The strands 31 can be made from suitable synthetic material such as nylon and are relatively rigid, rigid enough to stay straight when held at one end. About a dozen strands are used although as few as three or four could be used.

Ground contacting means 35 are provided which extend downwardly from the bottom surface 27 of the member 3. The ground contacting means 35 comprise a pair of pads 37 defining a groove 39 between them. The pads 37 start just in front of the opening 25 with the groove 39 aligned with the opening 25 and with the strands 31 extending back along the groove 39. Having the strands 31 located partly within the groove 39 helps to protect the strands. Preferably, the pads 37 are in the shape of the two main toes forming a deer's hoof. Two smaller pads 41 can be provided adjacent the rear of the member spaced slightly behind the pads 37 to complete the deer's hoof, the smaller pads imitating the two vestigial toes on the deer's hoof. Forming the ground contacting means 35 in the shape of a deer's hoof has use in marketing the dispenser. The ground contacting means also form a deer track which may help to attract deer, it being understood that a dispenser is worn on each foot by the hunter to leave the track.

Figure 4:
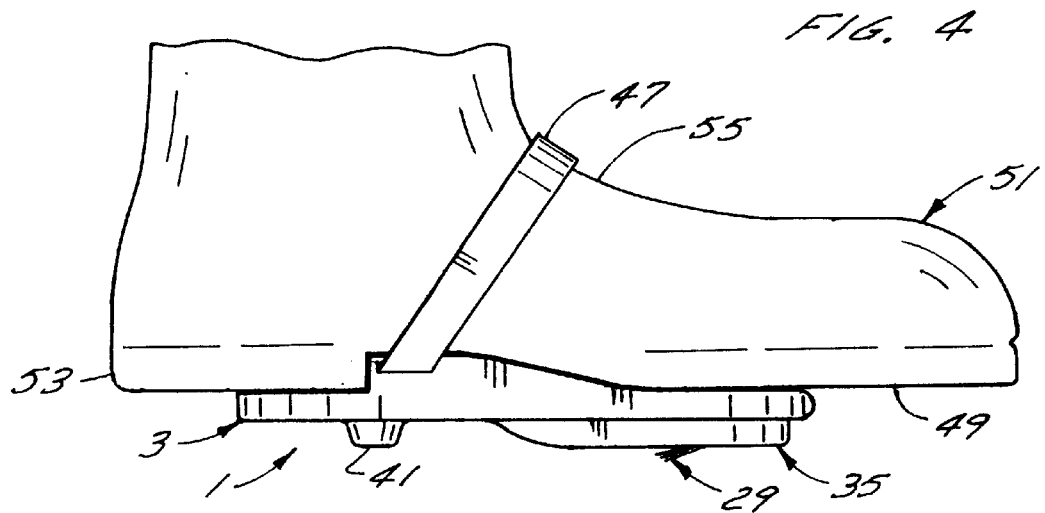
FIG. 4 shows the dispenser attached to footwear.

Slots 45 are formed on the sides of the member 3 adjacent the cutout 21, the slots 45 opening up in the top surface 9 of the member. Attaching straps 47 are mounted in each slot 45 for use in attaching the member to the boot of a hunter. As shown in FIG. 4 the member 3 is positioned with its top surface 9 against the sole 49 of a hunter's boot 51 and with the front of the heel 53 of the boot 51 located in the cutout 21. The straps 47 are attached about the instep 55 of the boot.

Figure 5:
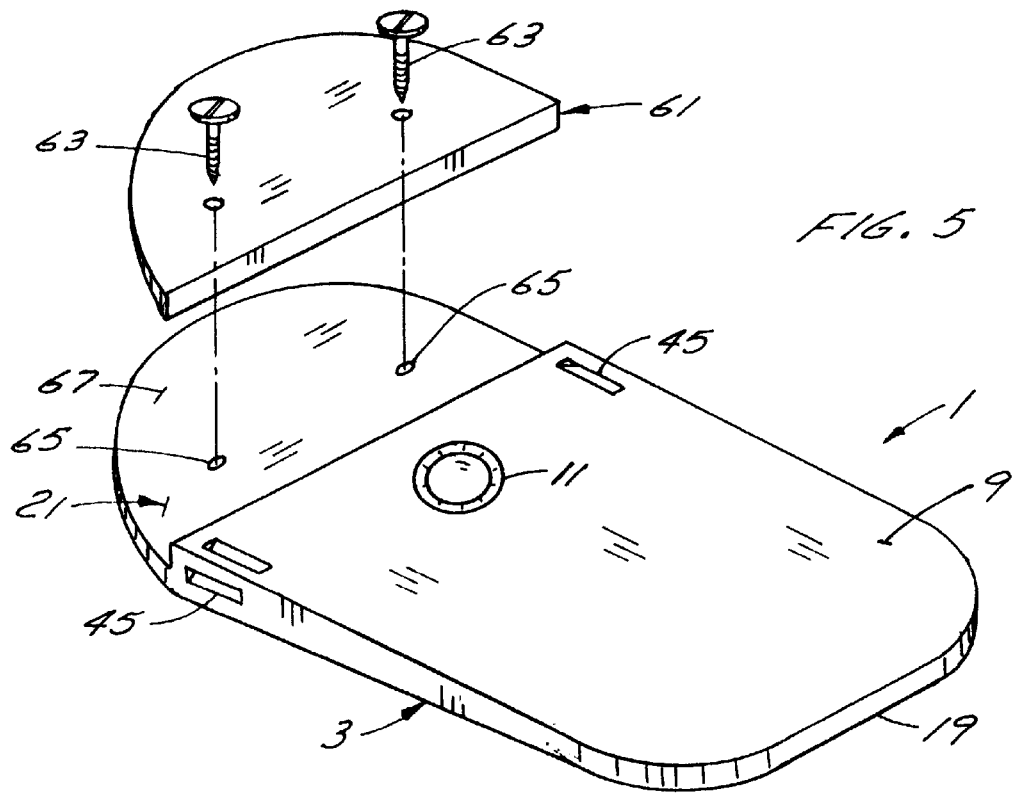
FIG. 5 shows an exploded, perspective, view of another embodiment of the dispenser for use with footwear having no heels.

If the hunter's boot has no heel, a filler block 61 can be attached to cutout 21, as shown in FIG. 5, to provide a relatively flat, top surface from the front to the back of the member making it more suitable for attachment to the sole of the heelless boot. Suitable fasteners such as screws 63 can attach the filler block 61, the screws 63 entering holes 65 formed in the horizontal surface 67 of the cutout 21. The filler blocks 61 are easily removed when not needed.

I claim:

1. A scent dispenser for use when hunting comprising: a rigid member having a top and bottom, the top of the member shaped to fit under the sole of a hunter's boot; the member having a reservoir for carrying liquid scent; an inlet opening in the member for filling the reservoir; closure means for the inlet opening; attaching means on the member for use in attaching the member to a hunter's boot; an outlet opening from the reservoir in the bottom of the member; distributing means leading from said outlet opening downwardly and rearwardly for distributing the liquid coming out of the reservoir through the outlet opening onto the ground when the member is in use worn on a boot; and ground contacting means projecting from the bottom of the member, the ground contacting means located on the bottom of the member to protect the distributing means.

2. A scent dispenser as claimed in claim 1 wherein the distributing means comprise a small number of relatively rigid strands of material embedded at one end in the member and extending out through the opening.

3. A scent distributor as claimed in claim 1 wherein the ground contacting means comprise two pads located to form a narrow groove between them, the groove beginning just in front of the opening and extending rearwardly therefrom, the distributing means located partly in the groove.

4. A scent distributor as claimed in claim 3 wherein the two pads are in the shape of a deer's hoof.

5. A scent distributor as claimed in claim 2 wherein the ground contacting means comprise two pads located to form a narrow groove between them, the groove beginning just in front of the opening and extending rearwardly therefrom, the strands of material located partly in the groove.

6. A scent distributor as claimed in claim 5 wherein the two pads are in the shape of a deer's hoof.

7. A scent dispenser as claimed in claim 2 including a cutout on the top, rear of the member, the cutout sized and shaped to receive the front portion of the heel of a boot to which the dispenser is to be attached.

8. A scent dispenser as claimed in claim 1 including a cutout on the top, rear of the member, the cutout sized and shaped to receive the front portion of the heel of a boot to which the dispenser is to be attached.

9. A scent dispenser as claimed in claim 7 including a filler member to fill the cutout, means for attaching the filler member to the member in the cutout when the member is to used with a boot that has no heel.

10. A scent dispenser as claimed in claim 8 including a filler member to fill the cutout, means for attaching the filler member to the member in the cutout when the member is to used with a boot that has no heel.

11. A scent dispenser as claimed in claim 1 wherein the ground contacting means are in the shape of a deer's hoof.

* * * * *